(12) United States Patent
Gruber et al.

(10) Patent No.: US 7,131,565 B2
(45) Date of Patent: Nov. 7, 2006

(54) FEED DEVICES AND METHODS FOR INJECTION MOLDED SOLDER SYSTEMS

(75) Inventors: Peter A Gruber, Mohegan Lake, NY (US); Lannie R Bolde, New Paltz, NY (US)

(73) Assignee: International Business Machines Corporation, Armonk, NY (US)

( * ) Notice: Subject to any disclaimer, the term of this patent is extended or adjusted under 35 U.S.C. 154(b) by 273 days.

(21) Appl. No.: 10/721,494

(22) Filed: Nov. 25, 2003

(65) Prior Publication Data

US 2005/0109823 A1    May 26, 2005

(51) Int. Cl.
*B23K 15/02* (2006.01)
*B23K 20/00* (2006.01)
*B23Q 15/00* (2006.01)
*B23Q 16/00* (2006.01)

(52) U.S. Cl. ............................... 228/8; 228/11; 228/40; 228/102; 228/103

(58) Field of Classification Search ...................... None
See application file for complete search history.

(56) References Cited

U.S. PATENT DOCUMENTS

| 2,964,007 | A | * | 12/1960 | Buffington | 228/12 |
| 2,986,108 | A | * | 5/1961 | Calehuff et al. | 228/28 |
| 3,389,683 | A | * | 6/1968 | Thomas | 118/69 |
| 3,510,345 | A | * | 5/1970 | Merchant | 427/432 |
| 3,570,741 | A | * | 3/1971 | Corsaro et al. | 228/40 |
| 4,889,273 | A | * | 12/1989 | Kondo | 228/8 |
| 5,244,143 | A | | 9/1993 | Ference et al. | 228/180 |
| 5,971,058 | A | | 10/1999 | Bolde et al. | 164/130 |
| 6,231,333 | B1 | * | 5/2001 | Gruber et al. | 425/546 |
| 6,321,333 | B1 | | 5/2001 | Gruber et al. | 425/546 |

FOREIGN PATENT DOCUMENTS

JP          02046971 A   *   2/1990

* cited by examiner

*Primary Examiner*—Lynne R. Edmondson
(74) *Attorney, Agent, or Firm*—Ohlandt, Greeley, Ruggiero & Perle, L.L.P.; Daniel P. Morris, Esq.

(57) ABSTRACT

A solder feeding device having a reservoir, a drive unit, a first lead, and a second lead is provided. The reservoir melts solid solder wire into molten solder, while the drive unit selectively feeds the solid solder wire into the reservoir. The first and second leads are in electrical communication with the drive unit. The first lead is positioned in the reservoir so that it electrically communicates with the second lead through the molten solder when the molten solder reaches a triggering level, but so that it does not electrically communicate with the second lead when the level is below the triggering level. The drive unit feeds the solid solder wire into the reservoir based upon a state of electrical communication between the first and second leads.

20 Claims, 3 Drawing Sheets

US 7,131,565 B2

FEED DEVICES AND METHODS FOR INJECTION MOLDED SOLDER SYSTEMS

BACKGROUND OF INVENTION

The present disclosure relates to injection molded solder systems. More particularly, the present disclosure relates to devices and methods for feeding solder to injection molded solder systems.

Injection molded solder (IMS) systems are described in U.S. Pat. Nos. 5,244,143, 5,971,058, and 6,231,333, all assigned to the assignee of the present invention, the content of each of which are incorporated herein by reference thereto. IMS systems are used for filling cavities in a graphite mold with molten solder that will be subsequently transferred and attached to a variety of electronic devices.

In general, IMS systems include a reservoir for molten solder, which is disposed over an injection plate or head. The injection plate is disposed over a graphite mold. The graphite mold when filled with solder, is in turn, disposed over a workpiece, such as a multi-layer ceramic substrate. The cavities in the graphite mold are aligned with the desired electrical contact locations on the substrate. To fill the graphite mold, molten solder is forced under gas pressure and/or drawn via vacuum from the reservoir through the injection head and into the mold cavities, which are later transferred to form electrical pathways on the substrate.

In order to properly form the desired electrical pathways, each cavity in the graphite mold is filled with molten solder during each molding cycle. In prior IMS systems, it has been necessary to interrupt the molding process between cycles to manually insert solder into the reservoir. For example, in molds having two thousand 20 mil holes the equivalent of a six inch length of 0.125 inches in diameter solder wire is required to fill the mold for each cycle.

However, it is desired to continuously operate IMS systems and, thus, it has been determined by the present application that a need exists for devices and methods that continuously and automatically feed solder to the reservoir of such IMS systems.

BRIEF DESCRIPTION OF THE INVENTION

Devices and methods are provided for automatically feeding solder, in a solid state, to a reservoir of molten solder.

Devices and methods that automatically feed solid solder wire to a reservoir of liquid solder in fluid communication with an injection molding solder head are also provided.

In one embodiment, a solder feeding device having a reservoir, a drive unit, a first lead, and a second lead is provided. The reservoir melts solid solder wire into molten solder, while the drive unit selectively feeds the solid solder wire into the reservoir. The first and second leads are in electrical communication with the drive unit. The first lead is positioned in the reservoir so that it electrically communicates with the second lead through the molten solder when the molten solder reaches a triggering level, but so that it does not electrically communicate with the second lead when the level is below the triggering level. The drive unit feeds the solid solder wire into the reservoir based upon a state of electrical communication between the first and second leads.

In other embodiments, the solder feeding device includes a reservoir, a drive unit, a control circuit, and a pair of leads. The reservoir melts a solid solder wire into molten solder and is fluidly connectable to an injection molded solder system. The drive unit selectively feeds the solid solder wire into the reservoir. The control circuit has an open state and a closed state and can control the drive unit to feed the solid solder wire into the reservoir based on the open state or the closed state. The pair of leads are in electrical communication with the control circuit. The control circuit is in the closed state when the pair of leads are in electrical communication with one another. Conversely, the control circuit is in the open state when the pair of leads are not in electrical communication with one another. The pair of leads electrically communicate with one another through the molten solder when the molten solder fills the reservoir to a triggering level.

In still other embodiments, a method of feeding solid solder wire to a reservoir of molten solder is provided. The method includes positioning a first lead in the reservoir so that the first lead electrically communicates with a second lead through the molten solder when a level of the molten solder is at least equal to a triggering level and so that the first lead does not electrically communicate with the second lead when the level is below the triggering level; activating a drive unit to feed the solid solder wire to the reservoir when the molten solder in the reservoir is below the triggering level; and deactivating the drive unit when the molten solder in the reservoir is at and above the triggering level.

The above-described and other features and advantages of the present disclosure will be appreciated and understood by those skilled in the art from the following detailed description, drawings, and appended claims.

DETAILED DESCRIPTION OF THE INVENTION

Figure 1:
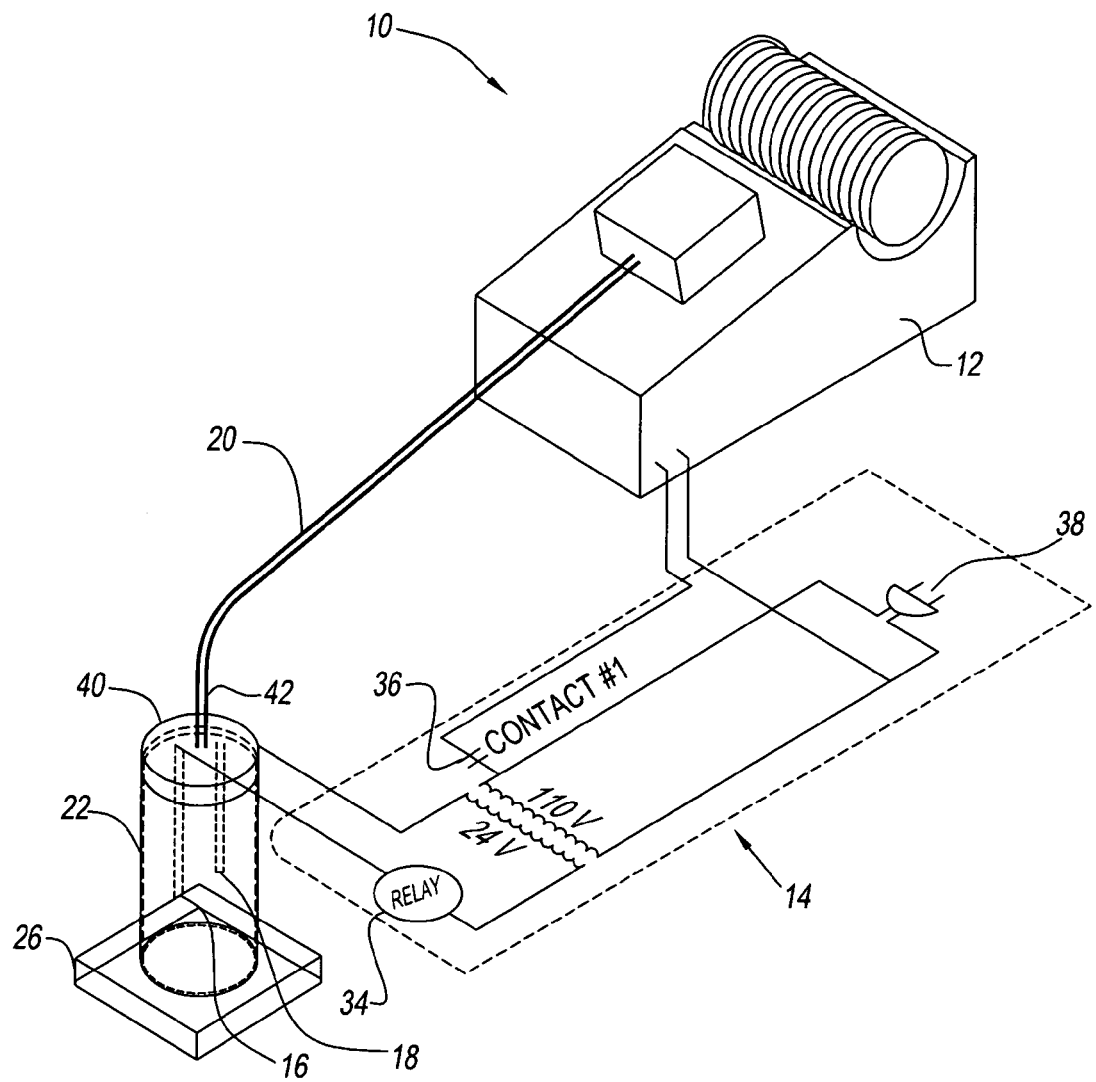
FIG. 1 is a perspective view of an exemplary embodiment of a solder feed device according to the present disclosure.
Figure 2:
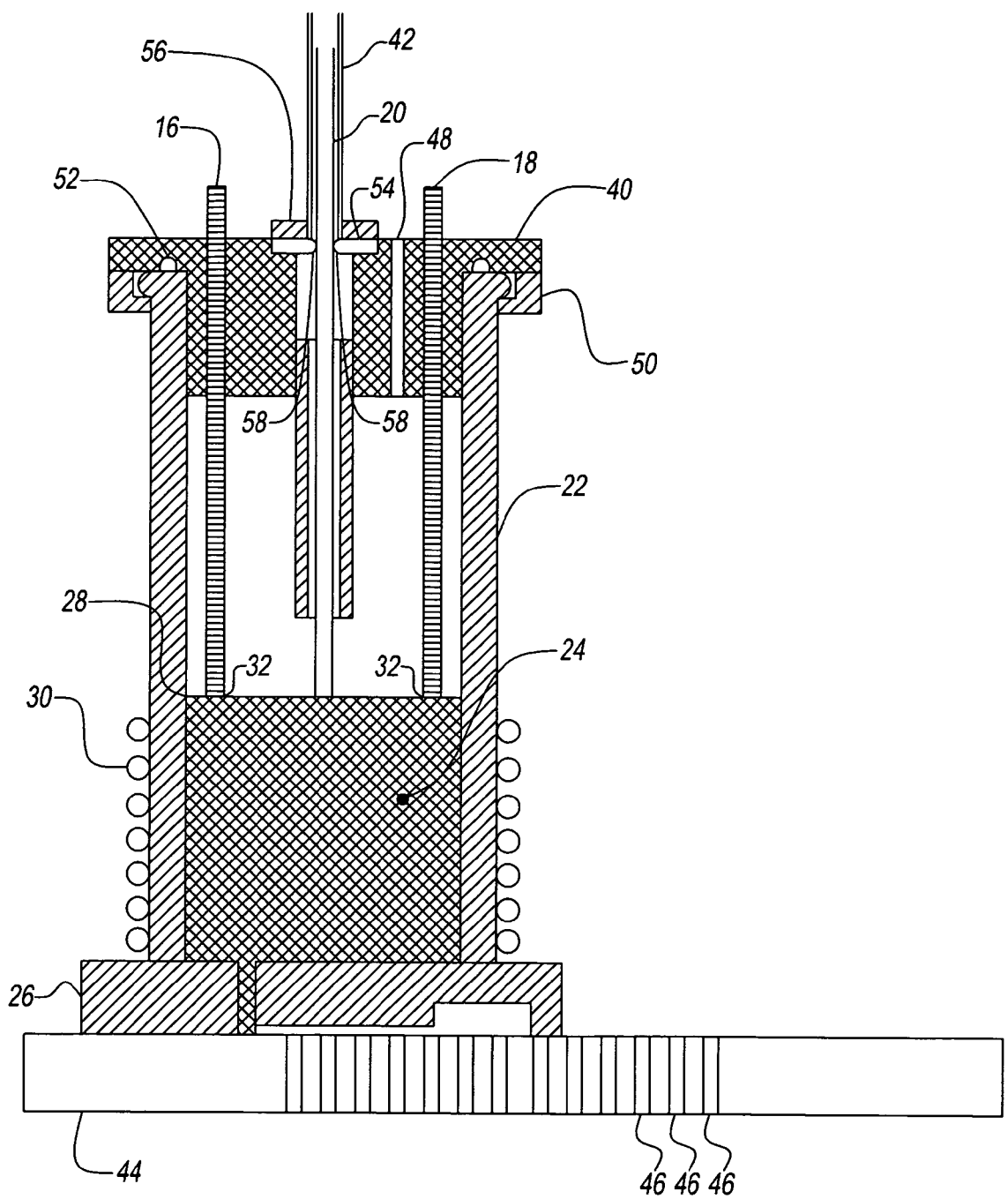
FIG. 2 is sectional view of a first exemplary embodiment of the solder feed device of FIG. 1.

Referring to the drawings and in particular to FIGS. 1 and 2, an exemplary embodiment of a solder feed device according to the present disclosure is illustrated by way of reference numeral 10. Device 10 has a drive unit 12, a control circuit 14, and a first lead 16, and a second lead 18. The first and second leads 16, 18 are in electrical communication with control circuit 14, which is in electrical communication with drive unit 12.

Drive unit 12 can be, for example, a Freehand Industrial Solder Feeder commercially available from Schurman Products Inc. Of course, it is contemplated by the present disclosure for drive unit 12 to be any solder driving unit.

Control circuit 14 is configured to selectively activate and deactivate drive unit 12 based on input from first and second leads 16, 18. When activated, feed unit feeds solid solder wire 20 to a solder reservoir 22 of an injection molded solder (IMS) system. For example, solder reservoir 22 can supply molten solder 24 to an IMS injection head 26.

In use, reservoir 22 is filled to a triggering level 28 of molten solder 24. Reservoir 22 can be filled to triggering level 28 by, for example, activating drive unit 12 to feed solid solder wire 20 into the reservoir. Reservoir 22 is maintained at a temperature sufficient to melt solid solder wire 20 into molten solder 24. In one embodiment, reservoir 22 can include a heater 30, such as a resistance wire. Thus, any solid solder wire 20 touching molten solder 24 in reservoir 22 will also melt. As this action continues, the level of molten solder 24 in reservoir 22 will rise.

Solid solder wire 20 is fed into reservoir 22 until the level of molten solder 24 reaches triggering level 28. At triggering level 28, first and second leads 16, 18 are both in electrical communication or contact with molten solder 24. Namely, device 10 uses molten solder 24 as a conductive medium to selectively place first lead 16 and second lead 18 in electrical communication with one another when the level of the molten solder reaches triggering level 28.

In one embodiment, first and second leads 16, 18 can have a terminal end 32 positioned in reservoir 22 at triggering level 28. In an alternate embodiment, second lead 18 can have its terminal end 32 positioned in reservoir 22 below triggering level 28, while first lead 16 can have its terminal end 32 positioned at triggering level 28. In both examples, the conductive properties of molten solder 24 in reservoir 22 places first lead 16 in electrical communication with second lead 18 when the level of the molten solder reaches triggering level 28.

Control circuit 14 acts as a switch for drive unit 12 depending on the state of contact among first lead 16, second lead 18 and molten solder 24. Control circuit 14 has a relay 34, a contact 36, and a source of control power 38. Control circuit 14 selectively applies and removes control power 38 to/from drive unit 12. Drive unit 12 feeds solid solder wire 20 to reservoir 22 when control power 38 is applied by control circuit 14. Conversely, drive unit 12 stops feeding solid solder wire 20 to reservoir 22 when control power 38 is removed by control circuit 14.

For example, contact 36 can be a normally closed contact. Here, control circuit 14 is closed when molten solder 24 is in electrical communication with both first lead 16 and second lead 18. Relay 34 opens the normally closed contact 36 when control circuit 14 is closed to remove control power 38 from drive unit 12. However, control circuit 14 is opened when molten solder 24 is no longer in electrical communication with both first and second leads 16, 18. Relay 34 returns contact 36 to its normally closed position when control circuit 14 is opened, which provides control power 38 to drive unit 12. In this example, control circuit 14 activates drive unit 12 to feed solid solder wire 20 to reservoir 22 unless molten solder 24 is in contact with first and second leads 16, 18.

Alternately, contact 36 can be a normally open contact. When molten solder 24 drops below triggering level 28, control circuit 14 is opened, which causes relay 34 to close the normally open contact 36. Closing of contact 36 applies control power 38 to drive unit 12 and feeds solid solder wire 20 into reservoir 22. When molten solder 24 reaches triggering level 28, control circuit 14 is closed, which causes relay 34 to return contact 36 to its normally open position and, thus, remove control power 38 from drive unit 12. In this example, control circuit 14 only activates drive unit 12 to feed solid solder wire 20 to reservoir 22 when molten solder 24 is not in contact with first and second leads 16, 18.

In this manner, solder feed device 10 uses the conductive nature of molten solder 24 to cause control circuit 14 to activate/deactivate drive unit 12 so that the level of molten solder in reservoir 22 is maintained at triggering level 28. It has been determined that using the conductive material properties of molten solder 24 allows for quick, accurate, and inexpensive volume measurement. For example, the conductivity of molten solder 24, as used by controlling circuit 14, is unaffected by the high temperature and volatile environment in reservoir 22. Further, the conductivity of molten solder 24, as used by controlling circuit 14, is unaffected by the any potential skins or oxides that can form on the surface of the molten solder.

Referring now to FIG. 2, solder feed device 10 can have a cap 40 positioned over reservoir 22. Cap 40 can maintain first and second leads 16, 18 in position in reservoir 22. Thus, first and second leads 16, 18 are maintained in reservoir 22 such that terminal end 32 of the highest of the two leads is located at a depth consistent with the triggering level 28. Cap 40 can be formed of an electrically non-conductive material having resistance to the high temperature environment of reservoir 22. In one embodiment, cap 40 is formed of a high temperature polyamide commercially available from E.I. Dupont and sold under the tradename VESPEL. Alternately, cap 40 can be formed of an electrically conductive material having resistance to the high temperature environment of reservoir 22. In this example, first and second leads 16, 18 are insulated from cap 40 by an insulation (not shown) disposed between the cap and the leads.

In some embodiments, cap 40 can have a feed guide 42. Feed guide 42 guides solid solder wire 20 from drive unit 12 into reservoir 22 through cap 40. For example, guide 42 can mitigate instances of kinking or bending in solid solder wire 20 as the solid solder wire is fed into reservoir 22.

Reservoir 22 is in fluid communication with injection head 26. Head 26 is in turn in fluid communication with a mold 44, which will subsequently transfer molten solder 24 to a substrate (not shown) via a plurality of mold cavities 46. In the embodiment illustrated in FIG. 2, molten solder 24 is forced from reservoir 22 to mold cavities 46 via a pressure assist. For example, cap 40 can have a pressure port 48 for inducing a positive pressure within reservoir 22. Pressure port 48 can be configured to induce a positive pressure of about 5 pounds per square inch in reservoir 22. Of course, it is contemplated by the present disclosure for pressure port 48 to be included in cap 40, a reservoir sidewall, a reservoir bottom, and any combinations thereof.

Reservoir 22 is sealed to ensure that the positive pressure induced in reservoir 22 through port 48 urges molten solder from the reservoir into mold cavities 46. For example, solder feed device 10 can have a clamp 50 and a gasket 52, as well as a solder seal 54 and a solder seal retainer 56. Clamp 50 secures cap 40 over reservoir 22, while gasket 52 prevents pressure induced in the reservoir via port 48 from exiting between the cap and the reservoir. Of course, other means of sealing cap 40 and reservoir 22 are contemplated by the present disclosure.

Solder seal 54 forms a seal between feed guide 42 and solid solder wire 20. Solder seal retainer 56 secures solder seal 54 to cap 40. Since solder seal 54 seals around solid solder wire 20 as the solid solder wire is being fed to reservoir 22, the solder seal forms a sliding seal with the solid solder wire. Preferably, solder seal 54 applies minimal friction to solid solder wire 20. In one exemplary embodiment, solder seal 54 has a tapered edge 58 that minimizes the contact area between the solder seal and solid solder wire 20. Solder seal 54 can be made of a material sufficient to withstand the high temperature environment of reservoir 22, while having a sufficiently low coefficient of friction to minimize drag on solid solder wire 20 as it is fed into the reservoir. For example, solder seal 54 can be formed of a Teflon coated temperature resistant polymer.

Accordingly, solder feed device 10 continuously and automatically maintains the triggering level 28 of molten solder 24 in reservoir 22. Further, solder feed device 10 maintains the desired pressure within reservoir 22 while feeding solid solder wire 20 into the reservoir. In this manner, solder feed device 10 allows the associated IMS system to be operated at a faster speed, without periodic stoppages to refill the reservoir, and/or with reduced operator assistance.

Figure 3:
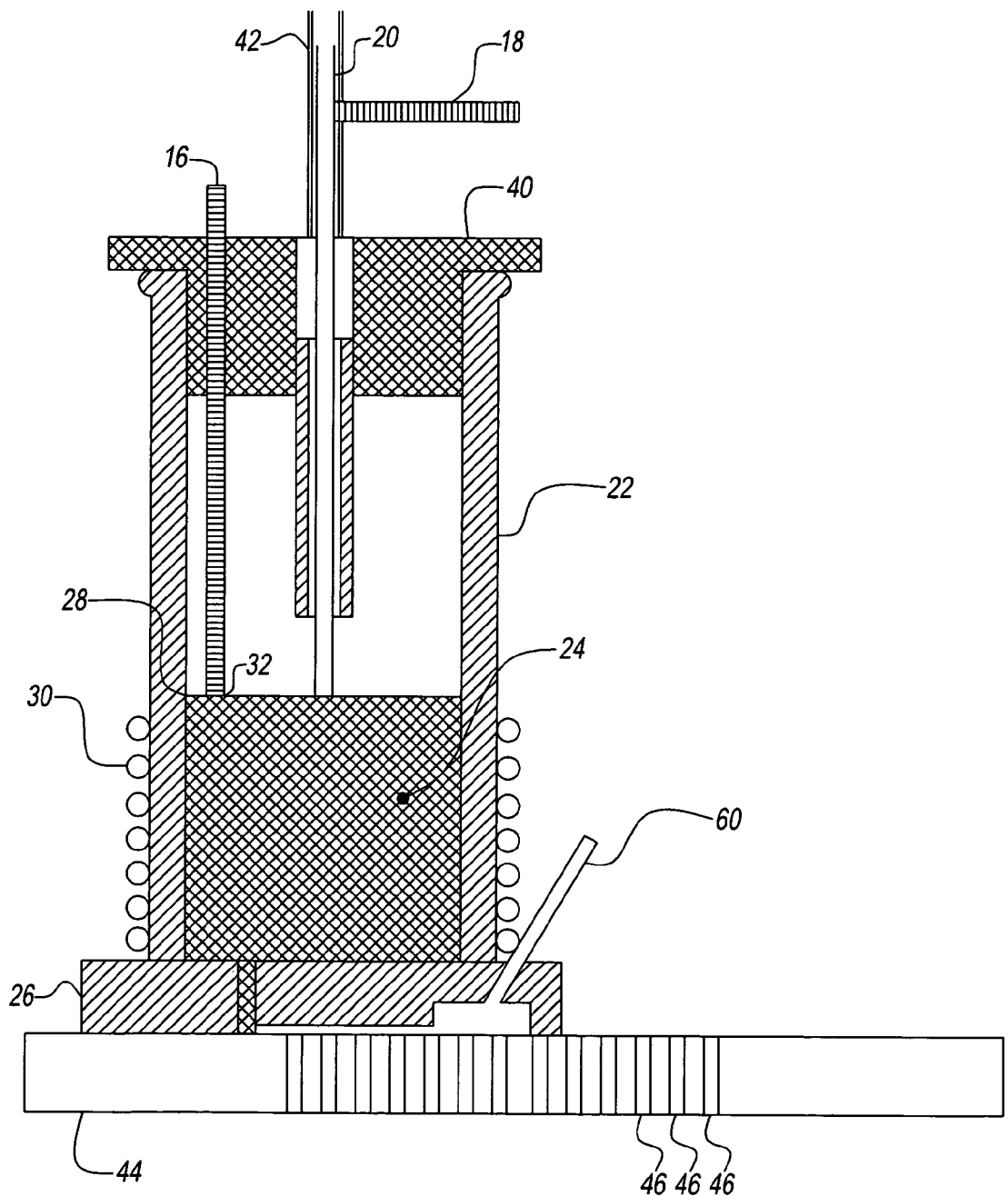
FIG. 3 is sectional view of a second exemplary embodiment of the solder feed device of FIG. 1.

Referring now to FIG. 3, an alternate exemplary embodiment of a solder feed device 10 according to the present disclosure is illustrated.

First lead 16 is positioned in reservoir 22 so that its terminal end 32 is located at triggering level 28. Thus, first lead 16 is in electrical communication with molten solder 24 when the molten solder is at triggering level 28.

Second lead 18 is also in electrical communication with molten solder 24 when the molten solder is at triggering level 28. Second lead 18 is in contact with solid solder wire 20 and the solid solder wire is fed into reservoir 22 until the solid solder wire contacts molten solder 24. In this manner, second lead 18 is in electrical communication with molten solder 24 through contact between the solid solder wire 20 and the molten solder. Thus, solder feed device 10 uses solid solder wire 20 itself to place second lead 18 in electrical communication with molten solder 24.

Second lead 18 is illustrated by way of example positioned in feed guide 42 in electrical communication with solid solder wire 20. However, it is contemplated by the present disclosure for second lead 18 to be located anywhere in solder feed device 10 provided that the second lead is in electrical communication with solid solder wire 20. For example, second lead 18 can be positioned in reservoir 22, drive unit 12, as well as other locations.

Solder feed device 10 of this embodiment also finds use with the control circuit 14 of FIG. 1 to selectively apply control power 38 to drive unit 12. Again, control circuit 14 acts as a switch for drive unit 12 depending on the state of contact among first lead 16, second lead 18 and molten solder 24.

The embodiment illustrated in FIG. 3, solder feed device 10 is depicted by way of example having a vacuum assist system. Here, molten solder 24 is drawn from reservoir 22 to mold cavities 46 via a vacuum assist. For example, injection head 26 can have a vacuum port 60 for inducing a negative pressure in mold 44 and mold cavities 46. The negative pressure in mold cavities 46 draws molten solder 24 from reservoir 22 into the mold cavities. In this example, the head space in reservoir 22 (e.g., the area above molten solder 24) is substantially ambient pressure, while negative pressure in mold cavities 46 draws molten solder 24 from reservoir 22.

It should be recognized that reservoir 22 is illustrated by way of example without the seals present in the embodiment of FIG. 2. Here, the vacuum assist renders sealing of reservoir unnecessary. However, it is contemplated that reservoir 22 have both the vacuum assist as well as the pressure assist described above.

Accordingly, solder feed device 10 continuously and automatically maintains the triggering level 28 of molten solder 24 in reservoir 22. Further, solder feed device 10 maintains the desired vacuum within cavities 46 while feeding solid solder wire 20 into the reservoir. In this manner, solder feed device 10 allows the associated IMS system to be operated at a faster speed, without periodic stoppages to refill the reservoir, and/or with reduced operator assistance.

It should be recognized that solder feed device 10 is illustrated by way of example having first lead 16, as well as second lead 18 when necessary, mounted in reservoir 22 through cap 40. Of course, it is contemplated by the present disclosure for the leads to be mounted in reservoir 22 in any desired manner such that triggering level 28 is maintained. For example, it is contemplated by the present disclosure for either of the leads to be mounted through cap 40, a reservoir sidewall, a reservoir bottom, and any combinations thereof.

It should also be recognized that solder feed device 10 is illustrated by way of example having two leads mounted in reservoir 22 in the pressure assisted IMS system and one lead mounted in reservoir 22 in the vacuum assisted IMS system. Of course, it is contemplated by the present disclosure for the two-lead and one-lead embodiments to find equal use in either the vacuum and/or the pressure assisted IMS systems.

It has been found that the use of molten solder 24 as both the dispensed liquid and the measuring medium provides solder feed device 10 with a simple, in-expensive solution to maintaining the triggering level 28 in reservoir 22.

The terms "first", "second", "third", "upper", "lower", and the like may be used herein to modify various elements. These modifiers do not imply a spatial, sequential, or hierarchical order to the modified elements unless specifically stated.

While the present disclosure has been described with reference to one or more exemplary embodiments, it will be understood by those skilled in the art that various changes may be made and equivalents may be substituted for elements thereof without departing from the scope of the present disclosure. In addition, many modifications may be made to adapt a particular situation or material to the teachings of the disclosure without departing from the scope thereof. Therefore, it is intended that the present disclosure not be limited to the particular embodiment(s) disclosed as the best mode contemplated, but that the disclosure will include all embodiments falling within the scope of the appended claims.

What is claimed is:

1. A solder feeding device comprising:
a reservoir being configured to melt a solid solder wire into molten solder, said reservoir being fluidly connectable to an injection molded solder system;
a drive unit being configured to selectively feed said solid solder wire into said reservoir;
a first lead in electrical communication with said drive unit; and
a second lead in electrical communication with said drive unit, said first lead being positioned in said reservoir so that said first lead electrically communicates with said second lead through said molten solder when said molten solder reaches a triggering level and so that said first lead does not electrically communicate with said second lead when said level is below said triggering level, said drive unit being configured to feed said solid solder wire into said reservoir based upon a state of electrical communication between said first and second leads,
wherein said reservoir is configured to maintain a positive pressure therein while said drive unit feeds said solid solder wire into said reservoir.

2. The device of claim 1, wherein said drive unit feeds said solid solder wire into said reservoir when said first and second leads are in electrical communication with one another or when said first and second leads are not in electrical communication with one another.

3. The device of claim 1, wherein said second lead is positioned in said reservoir at or below said triggering level.

4. The device of claim 1, wherein said second lead is in electrical communication with said solid solder wire so that said first lead electrically communicates with said second lead through said molten solder and said solid solder wire when said molten solder is at said triggering level.

5. The device of claim 4, wherein said second lead is positioned inside or outside of said reservoir.

6. The device of claim 1, further comprising a sliding seal around said solid solder wire, said sliding seal being configured to maintain said positive pressure in said reservoir while said drive unit feeds said solid solder wire into said reservoir.

7. A solder feeding device comprising:
 a reservoir being configured to melt a solid solder wire into molten solder, said reservoir being fluidly connectable to an injection molded solder system;
 a drive unit being configured to selectively feed said solid solder wire into said reservoir;
 a first lead in electrical communication with said drive unit;
 a second lead in electrical communication with said drive unit, said first lead being positioned in said reservoir so that said first lead electrically communicates with said second lead through said molten solder when said molten solder reaches a triggering level and so that said first lead does not electrically communicate with said second lead when said level is below said triggering level, said drive unit being configured to feed said solid solder wire into said reservoir based upon a state of electrical communication between said first and second leads;
 a feed guide for guiding said solid solder wire from said drive unit into said reservoir; and
 a sliding seal around the solid solder wire in said feed guide to maintain a positive pressure in said reservoir while said drive unit feeds said solid solder wire to said reservoir.

8. A solder feeding device comprising:
 a reservoir being configured to melt a solid solder wire into molten solder, said reservoir being fluidly connectable to an injection molded solder system;
 a drive unit being configured to selectively feed said solid solder wire into said reservoir;
 a control circuit having an open state and a closed state, said control circuit controlling said drive unit to feed said solid solder wire into said reservoir based on said open state or said closed state; and
 a pair of leads in electrical communication with said control circuit, said control circuit being in said closed state when said pair of leads are in electrical communication with one another and said open state when said pair of leads are not in electrical communication with one another, said pair of leads electrically communicating with one another through said molten solder when said molten solder fills said reservoir to a triggering level, wherein said reservoir is configured to maintain a positive pressure therein while said drive unit feeds said solid solder wire into said reservoir.

9. The device of claim 8, further comprising a sliding seal around said solid solder wire, said sliding seal being configured to maintain said positive pressure in said reservoir while said drive unit feeds said solid solder wire into said reservoir.

10. A solder feeding device comprising:
 a reservoir being configured to melt a solid solder wire into molten solder, said reservoir being fluidly connectable to an injection molded solder system;
 a drive unit being configured to selectively feed said solid solder wire into said reservoir;
 a control circuit having an open state and a closed state, said control circuit controlling said drive unit to feed said solid solder wire into said reservoir based on said open state or said closed state;
 a pair of leads in electrical communication with said control circuit, said control circuit being in said closed state when said pair of leads are in electrical communication with one another and said open state when said pair of leads are not in electrical communication with one another, said pair of leads electrically communicating with one another through said molten solder when said molten solder fills said reservoir to a triggering level;
 a feed guide for guiding said solid solder wire from said drive unit into said reservoir; and
 a sliding seal around the solid solder wire in said feed guide to maintain a positive pressure in said reservoir while said drive unit feeds said solid solder wire to said reservoir.

11. A method of feeding solid solder wire to a reservoir of molten solder, comprising:
 positioning a first lead in the reservoir so that said first lead electrically communicates with a second lead through the molten solder when a level of the molten solder is at least equal to a triggering level and so that said first lead does not electrically communicate with said second lead when said level is below said triggering level;
 positioning said second lead in electrical communication with the solid solder wire so that said first lead electrically communicates with said second lead through the molten solder and the solid solder wire when said level is at said triggering level;
 activating a drive unit to feed the solid solder wire to the reservoir when the molten solder in the reservoir is below said triggering level; and
 deactivating said drive unit when the molten solder in the reservoir is at and above said triggering level.

12. The method of claim 11, wherein electrical communication between said first and second leads at said triggering level closes a control circuit.

13. The method of claim 12, wherein said control circuit activates or deactivates said drive unit when said control circuit is closed.

14. The method of claim 11, wherein said second lead is positioned inside or outside of the reservoir.

15. A method of feeding solid solder wire to a reservoir of molten solder, comprising:
 positioning a first lead in the reservoir so that said first lead electrically communicates with a second lead through the molten solder when a level of the molten solder is at least equal to a triggering level and so that said first lead does not electrically communicate with said second lead when said level is below said triggering level;
 activating a drive unit to feed the solid solder wire to the reservoir when the molten solder in the reservoir is below said triggering level;
 deactivating said drive unit when the molten solder in the reservoir is at and above said triggering level; and
 maintaining a desired pressure in the reservoir while said drive unit feeds the solid solder wire to the reservoir.

16. The method of claim 15, wherein said desired pressure is a positive pressure maintained by a sliding seal around the solid solder wire.

17. The method of claim 16, further comprising a pressure assist system for generating said positive pressure in the reservoir.

18. The method of claim 15, further comprising a vacuum assist system for drawing said molten solder from the reservoir.

19. A method of feeding solid solder wire to a reservoir of molten solder, comprising:

positioning a first lead in the reservoir so that said first lead electrically communicates with a second lead through the molten solder when a level of the molten solder is at least equal to a triggering level and so that said first lead does not electrically communicate with said second lead when said level is below said triggering level;

activating a drive unit to feed the solid solder wire to the reservoir when the molten solder In the reservoir is below said triggering level; deactivating said drive unit when the molten solder in the reservoir is at and above said triggering level; and positioning a feed guide in a cap of the reservoir, said feed guide guiding the solid solder wire from said drive unit into said reservoir.

20. The method of claim 19, further comprising positioning a sliding seal around the solid solder wire in said feed guide to maintain a positive pressure in the reservoir while said drive unit feeds the solid solder wire to the reservoir.

* * * * *